B. F. CLOUD.
Lathe-Dog.
No. 214,885. Patented April 29, 1879.
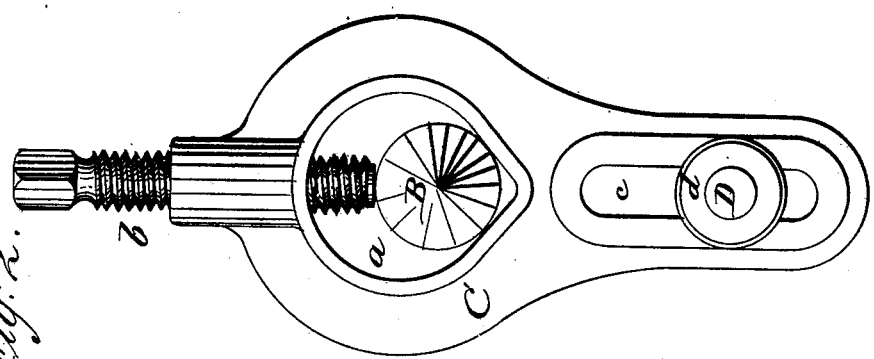
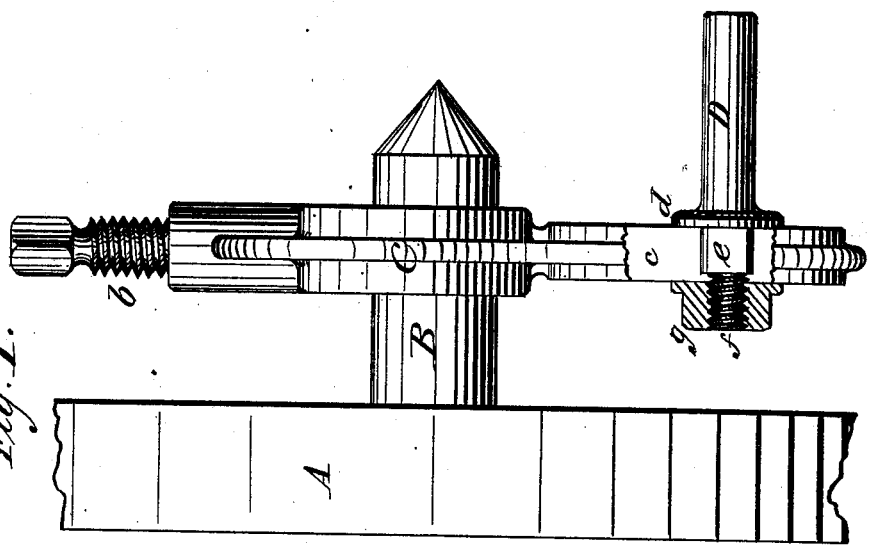
WITNESSES:
Achilles Schehl.
C. Sedgwick
INVENTOR:
B. F. Cloud
BY Munn & Co.
ATTORNEYS.

UNITED STATES PATENT OFFICE.

BENJAMIN F. CLOUD, OF PHILADELPHIA, PENNSYLVANIA.

IMPROVEMENT IN LATHE-DOGS.

Specification forming part of Letters Patent No. 214,885, dated April 29, 1879; application filed February 17, 1879.

*To all whom it may concern:*

Be it known that I, BENJAMIN F. CLOUD, of the city and county of Philadelphia, and State of Pennsylvania, have invented a new and Improved Lathe-Dog, of which the following is a specification.

The object of this invention is to provide the dog with a movable or adjustable arm or carrier, to adapt it to hold objects at points more or less remote from the center.

It consists in making the arm or carrier with a collar and a projecting stud, which is passed through a slot in the dog, and provided with a set-nut, screwed on the end, whereby the arm can be moved to and from the center and secured in any desired position.

In the accompanying drawings, Figure 1 is an edge view of a lathe head and center with dog attached, the revolving or carrying end of the dog being cut away to show the position of the adjustable carrier; and Fig. 2 is a face view of the dog.

Similar letters of reference indicate corresponding parts.

Referring to the drawings, A represents a lathe-head, with center B. C is the dog, with an eye, $a$, in the larger end, to receive the center B, which is fastened therein by a set-screw, $b$, in the usual manner. The carrier end of the dog is provided with a longitudinal slot, $c$.

D represents the carrier, the fixed end whereof is provided with a collar, $d$, from which extends a flat-sided neck or stud, $e$, with a screw-stud extension, $f$, on which is a screw-nut, $g$. The neck of the carrier is placed in the slot $c$, with its flat sides parallel to the sides of the slot, so that it may be freely moved up and down the slot without turning.

By means of the nut $g$ the carrier can be adjusted at any distance from the center within the limits of the slot $c$, and thus the dog is adapted to turning objects of a variety of sizes, or where the holding-points are at various distances from the center; and, further, the leverage can be increased and diminished at pleasure.

Having thus fully described my invention, I claim as new and desire to secure by Letters Patent—

As an improvement in lathe-dogs, the carrier or arm D, held in slot $c$ of the carrier end of the dog by a set-nut, $g$, and adjustable to and from the center, in the manner substantially as described.

BENJAMIN F. CLOUD.

Witnesses:
CHARLES F. PANCOAST,
EDWD. H. CLOUD.